United States Patent [19]
Ogi

[11] Patent Number: 5,864,725
[45] Date of Patent: Jan. 26, 1999

[54] CONTROL METHOD OF SINGLE LENS REFLEX CAMERA HAVING PREVIEW FUNCTION AND SINGLE LENS REFLEX CAMERA

[75] Inventor: Mikio Ogi, Tokyo, Japan

[73] Assignee: Asahi Kogaku Kogyo Kabushiki Kaisha, Tokyo, Japan

[21] Appl. No.: 972,543

[22] Filed: Nov. 18, 1997

[30] Foreign Application Priority Data

Nov. 19, 1996 [JP] Japan .................................. 8-308516

[51] Int. Cl.⁶ ..................................................... G03B 17/24
[52] U.S. Cl. ........................... 396/358; 396/461; 396/509
[58] Field of Search .................................... 396/358, 461, 396/509

[56] References Cited

U.S. PATENT DOCUMENTS

| | | |
|---|---|---|
| 4,792,730 | 12/1988 | Ootsuka et al. . |
| 4,792,823 | 12/1988 | Fujino et al. . |
| 4,835,558 | 5/1989 | Araki et al. . |
| 5,257,052 | 10/1993 | Kurosaki et al. . |

FOREIGN PATENT DOCUMENTS

| | | |
|---|---|---|
| 2-77045 | 3/1990 | Japan . |
| 1450584 | 9/1976 | United Kingdom . |
| 2222691 | 3/1990 | United Kingdom . |

OTHER PUBLICATIONS

A Search Report issued with UK App. No. GB 9724169.9.
A Search Report issued with UK App. No. GB 9724172.3.
Copy of a United Kingdom Search Report issued with UK App. No. 9724171.5.

*Primary Examiner*—David M. Gray
*Attorney, Agent, or Firm*—Greenblum & Bernstein, P.L.C.

[57] ABSTRACT

A method for controlling a single lens reflex camera having a preview function is provided in which a mirror drive mechanism, a diaphragm drive mechanism, and a shutter are driven in association with the rotation of a single-revolution cam gear which is driven by a motor. When the release switch is turned ON, the single-revolution cam gear is rotated by a single revolution in the forward direction, and when an external preview switch is turned ON, the preview operation is carried out by the reverse rotation of the single-revolution cam gear within a predetermined angle range in which the stop-down operation takes place without causing an upward movement of the mirror. When the release switch is turned ON during the preview operation, the motor is rotated in the forward direction until the single revolution cam gear is returned to the initial position, so that the photometering operation is carried out at the full-open aperture position.

5 Claims, 14 Drawing Sheets

CONTROL METHOD OF SINGLE LENS REFLEX CAMERA HAVING PREVIEW FUNCTION AND SINGLE LENS REFLEX CAMERA

BACKGROUND OF THE INVENTION

1. Field of the Invention

The present invention relates to a method for controlling a single lens reflex camera having a preview function (to confirm the depth of field) and a single lens reflex camera.

2. Description of the Related Art

In a known preview apparatus having a preview switch which can be actuated independently of the release switch, an electrically driven motor is rotated in the forward direction, so that the preview operation and the release operation are effected sequentially during a single revolution of the single-revolution cam gears which are rotated in association with the motor (e.g., Japanese Unexamined Patent Publication No. 2-77045 or U.S. Pat. No. 5,257,052 corresponding thereto). In this preview apparatus, when the motor is rotated in the forward direction, the stop-down operation to close the aperture is first effected by the cam gears and thereafter, the upward movement of the mirror and the movement of the shutter are carried out upon completion of the stop-down operation.

With this structure, if the release switch is turned ON during the preview operation, the photographing operation begins. Consequently, the exposure is controlled in accordance with old or previous photometering data obtained when the preview switch has been turned ON or after the stop-down operation to reduce the aperture size has been effected. In particular, in a full-open (open aperture) photometering camera, no precise photometering data can be obtained. It is in theory possible to return the cam gears to the respective initial positions by reversing the motor from the preview position, so that the full-open photometering operation can be carried out. However, since it is necessary to reciprocally move the cam gears between the preview position and the initial positions prior to the release operation, the time lag between the release operation and the movement of the shutter is undesirably increased.

It is an object of the present invention to provide a control method of a single lens reflex camera having a preview function and a single lens reflex camera having a preview function in which the exposure can be precisely controlled if the release switch is depressed during the preview operation.

SUMMARY OF THE INVENTION

To achieve the object mentioned above, according to the present invention, there is provided a method for controlling a single lens reflex camera having a preview function in which a mirror drive mechanism which moves a mirror between a lower position in which the mirror is located in a photographing light path and an upper position in which the mirror is retracted from the photographing light path, a diaphragm drive mechanism which opens or closes the diaphragm of a lens and a shutter of which are driven in association with a single-revolution cam gear(s) which is driven by a motor in forward and rearward directions, the single-revolution cam gear executing sequentially, by a single forward revolution thereof from its initial position; a stop-down operation to vary the diaphragm from the full-open position to the set diaphragm position and the upward movement of the mirror, the actuation of the shutter, the downward movement of the mirror, and the reset operation of the diaphragm to move from the stop-down position to the full-open position, the single-revolution cam gear executes, by the rotation thereof in the rearward direction from its initial position, the stop-down operation to move the diaphragm from the full-open position to the set diaphragm position; a preview switch which can be actuated from outside, the preview switch being provided in addition to a release switch so that when the release switch is turned ON, the single-revolution cam gear is rotated by a single revolution in the forward direction from the initial position, and when the preview switch is turned ON, the preview operation is carried out by the reverse rotation of the single-revolution cam gear within a predetermined angle range in which the stop-down operation takes place without causing an upward movement of the mirror.

The method comprising steps of: returning the diaphragm to the full-open aperture position from the stop-down position when the release switch is turned ON during the preview operation by rotating the motor in the forward direction-until the single-revolution cam gear is returned to the initial position, and photometering at the full-open aperture position.

The single-revolution cam gear is rotated in the forward direction by a single revolution by the forward rotation of the motor after the photometering operation is carried out at the full-open aperture position. Thus, the exposure can be controlled in accordance with photometering data at full-open aperture.

According to another aspect of the present invention, there is provided a method for controlling a single lens reflex camera having a preview function, the camera having a mirror drive mechanism which moves a mirror between a lower position in which the mirror is located in a photographing light path and an upper position in which the mirror is retracted from the photographing light path; a diaphragm drive mechanism which opens or closes the diaphragm of a lens and a shutter are driven in association with a single-revolution cam gear which is driven by a motor in forward and rearward directions, the single-revolution cam gear executing sequentially, by a single revolution forward thereof from its initial position, the stop-down operation to vary the diaphragm from the full-open position to the set diaphragm position and the upward movement of the mirror, the actuation of the shutter, the downward movement of the mirror, and the reset operation of the diaphragm to move from the stop-down position to the full-open position; the single-revolution cam gear executing, by the rotation thereof in the rearward direction from its initial position, the stop-down operation to move the diaphragm from the full-open position to the set diaphragm position; and a preview switch which can be actuated from outside, the preview switch being provided in addition to a release switch so that when the release switch is turned ON, the single-revolution cam gear is rotated by a single revolution in the forward direction from the initial position, and when the preview switch is turned ON, the preview operation is carried out by the reverse rotation of the single-revolution cam gear within a predetermined angle range in which the stop-down operation takes place without causing an upward movement of the mirror.

The method comprising steps of: returning the diaphragm to the full-open aperture position from the stop-down position when the release switch is turned ON during the preview operation by rotating the motor in the forward direction until the single-revolution cam gear is returned to the initial position; a further rotating of the single-revolution cam gear in the forward direction without being stopped at the initial position.

Preferably, if the release switch is turned ON while the preview switch is ON, the photometering operation is carried out when the single-revolution cam gear is returned to the initial position.

According to another aspect of the present invention, there is provided a single lens reflex camera having a preview function in which a mirror drive mechanism which moves a mirror between a lower position in which the mirror is located in a photographing light path and an upper position in which the mirror is retracted from the photographing light path, a diaphragm drive mechanism which opens or closes the diaphragm of a lens and a shutter are driven in association with a single-revolution cam gear which is driven by a motor in forward and rearward directions; the single-revolution cam gear executing sequentially, by the a single forward rotation thereof from its initial position, the stop-down operation to vary the diaphragm from the full-open position to the set diaphragm position and the upward movement of the mirror, the actuation of the shutter, the downward movement of the mirror, and the reset operation of the diaphragm to move from the stop-down position to the full-open position; the single-revolution cam gear executes, by the rotation thereof in the rearward direction from its initial position, the stop-down operation to move the diaphragm from the full-open position to the set diaphragm position; a preview switch which can be actuated from outside, the preview switch being provided in addition to a release switch so that when the release switch is turned ON, the single-revolution cam gear is rotated by a single revolution in the forward direction from the initial position, and when the preview switch is turned ON, the preview operation is carried out by the reverse rotation of the single-revolution cam gear within a predetermined angle range in which the stop-down operation takes place without causing an upward movement of the mirror; and a controller which returns the diaphragm to the full-open aperture position from the stop-down position when the release switch is turned ON during the preview operation by rotating the motor in the forward direction until the single-revolution cam gear is returned to the initial position and photometering at the full-open aperture position.

Note that in the present invention, when the motor is rotated forwards, the direction of the rotation of the cam gears is referred to as the "forward direction" and when the motor is rotated rearward, the direction of the rotation of the cam gears is referred to as the "reverse direction". Therefore, in the case that there are a plurality of cam gears, the directions of the rotation of the cam gears can differ from each other. The direction of the rotation of the cam gears caused by the forward rotation of the motor always is defined as the "forward direction" and the direction of the rotation of the cam gears caused by the reverse direction of the motor always defines a "reverse direction".

The present disclosure relates to subject matter contained in Japanese Patent Application No. 8-308516 (filed on Nov. 19, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
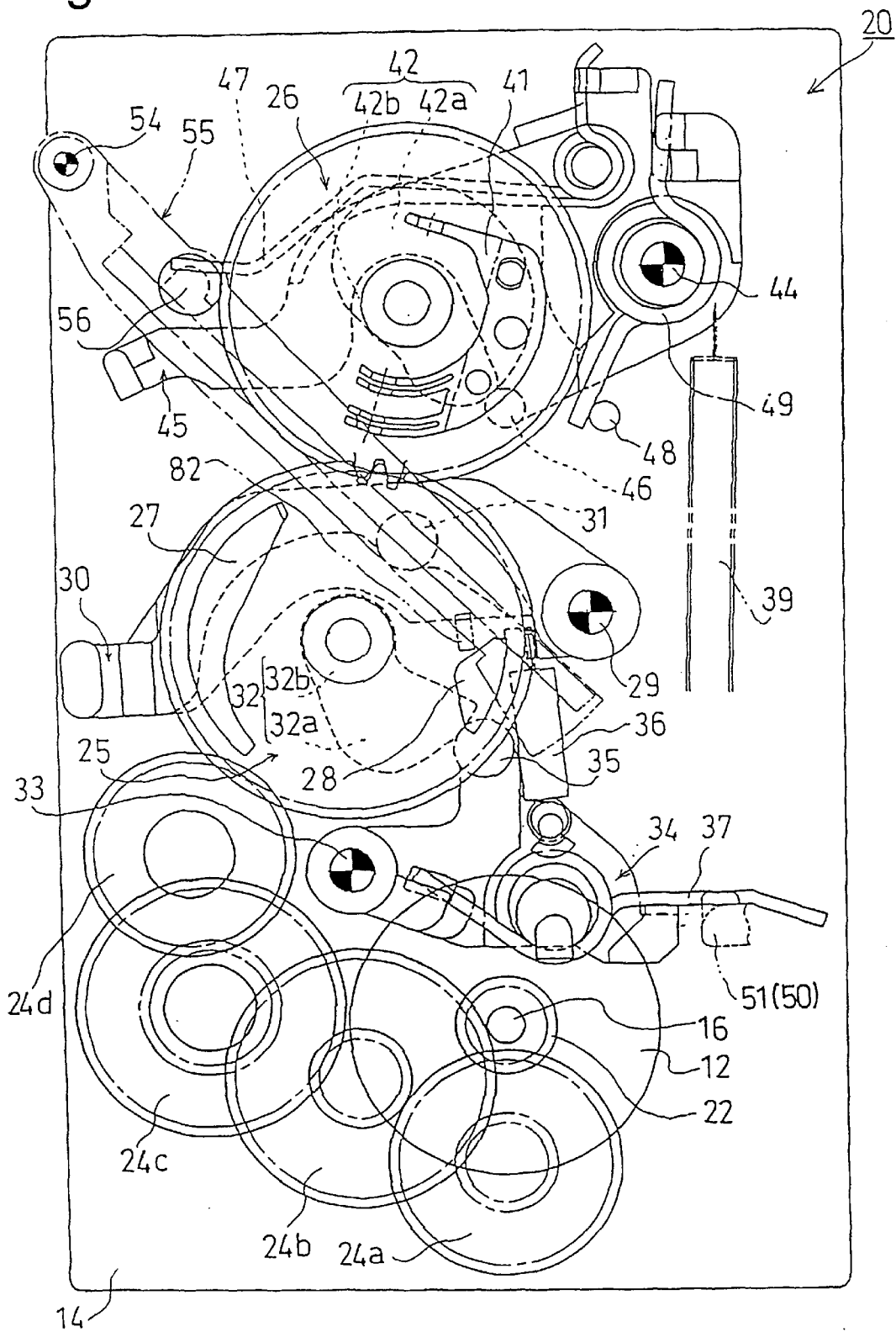
FIG. 1 is a side elevational view of a mirror drive mechanism when each cam gear is located at an initial position, as viewed from the direction I in FIG. 6.

Embodiments of the present invention will be discussed below. Looking at FIG. 6, a mirror box 11 which is provided at the substantially central portion of a camera body 13 of a single lens reflex camera 10 (referred to as a camera) is provided with side plates 14 (14a, 14b) and a bottom plate 15. The mirror box 11 is also provided with an intermediate plate 17 opposed to the left side plate 14a as viewed from front. A mirror drive mechanism 20 is provided in a gap defined between the side plate 14a and the intermediate plate 17. An auxiliary side plate 18 is provided on the left side of the side plate 14a. A diaphragm control mechanism 60 is provided in a gap defined between the intermediate plate 17 and the auxiliary side plate 18. A mechanism driving motor (referred to as a motor) 12 is secured to the lower end of the intermediate plate 17 and has a drive shaft 16 (FIG. 1, etc.) which projects in the vicinity of the mirror drive mechanism 20.

The camera body 13 is provided on the front surface thereof with a lens mount opposed to the mirror box 11, so that a photographing lens barrel can be detachably attached to the lens mount 19. In the drawings, the lens barrel which is provided therein with a diaphragm mechanism and a focusing lens group is not shown but is mounted to the lens mount 19.

Figure 2:
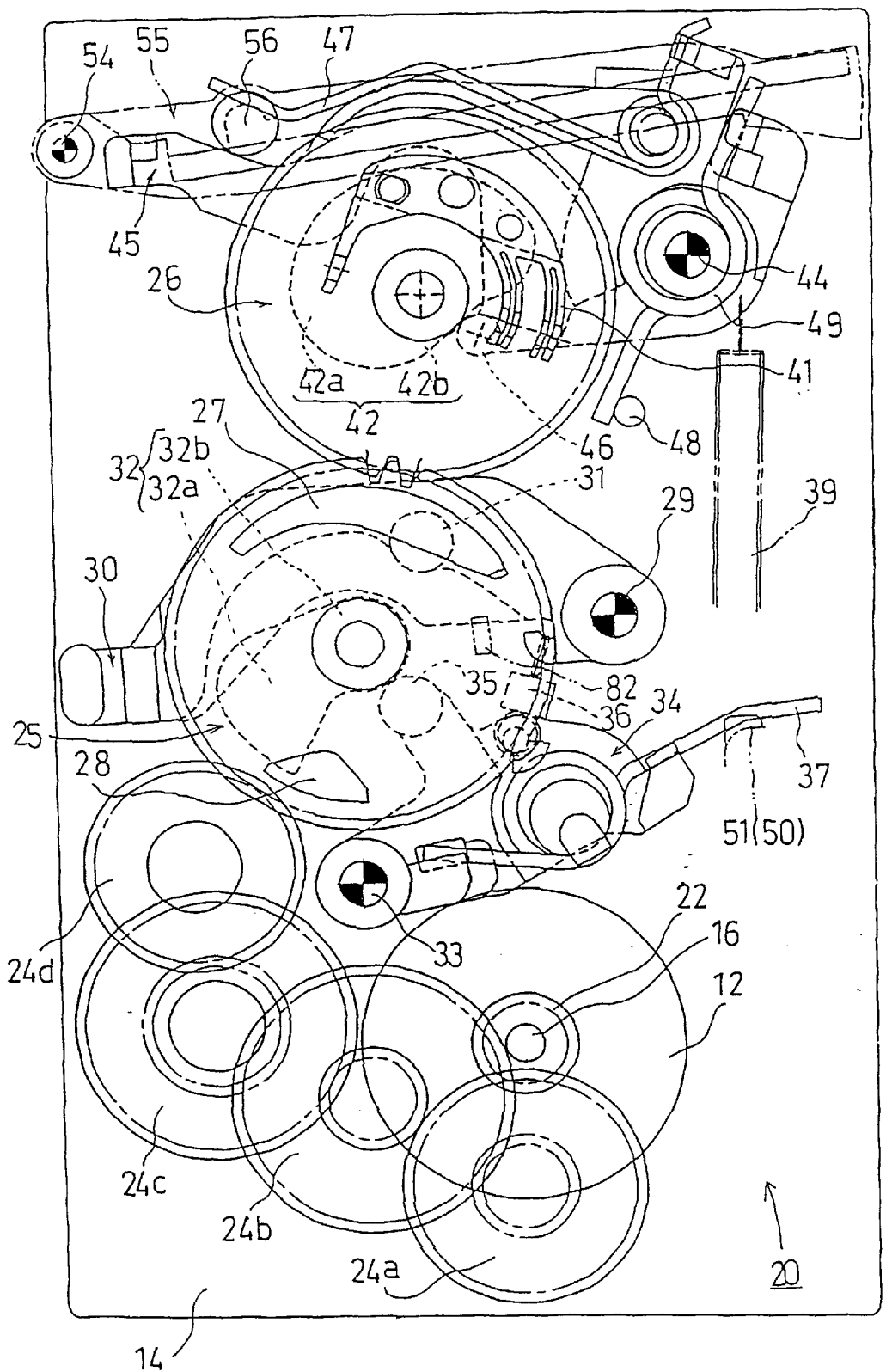
FIG. 2 is a side elevational view of a mirror drive mechanism immediately before a shutter moves upon normal releasing.
Figure 3:
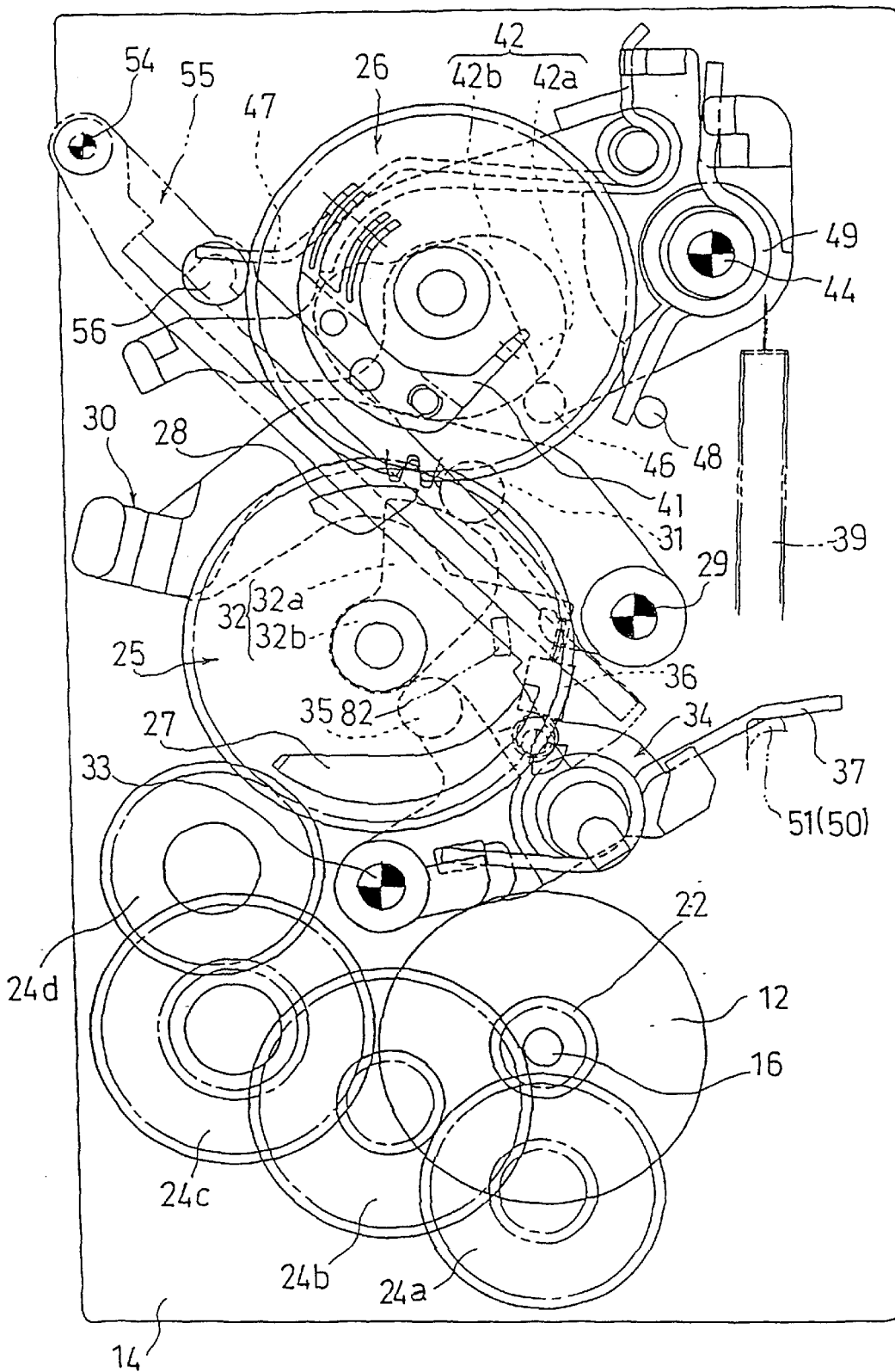
FIG. 3 is a side elevational view of a mirror drive mechanism upon previewing.

FIGS. 1 through 3 show side views of the mirror drive mechanism 20 which is driven by the motor 12. A pinion 22 which is secured to the drive shaft 16 of the motor 12 and a gear train which is in mesh with the pinion are rotatably supported on the side plate 14a and between the side plate 14a and the intermediate plate 17. The gear train is composed of reduction gears 24a–24d, a single-revolution cam gear 25 for shutter/diaphragm (referred to as a shutter/diaphragm cam gear), and a single-revolution cam gear 26 for a mirror (referred to as a mirror cam gear). The number of the teeth of the shutter/diaphragm cam gear 25 is identical to the number of the teeth of the mirror cam gear 26 (gear ratio=1:1). The gears of the gear train are all spur gears.

The mirror cam gear 26 is integrally provided on the front surface (in FIGS. 1 through 3) thereof with an angular position detection brush 41, and on the rear surface with a mirror driving cam 42, respectively. The latter is provided with a semicircular portion 42a and a recessed portion 42b. The mirror driving cam 42 engages with a cam follower (roller) 46 of a shutter disengaging lever 45 which is pivoted to the side plate 14a by a pivot shaft 44. The shutter disengaging lever 45 is continuously biased in a clockwise direction (upward direction) in FIG. 1, by means of a mirror drive spring 49 whose one end engages with a support pin 48 provided on the side plate 14a. In FIG. 1 in which the mirror cam gear 26 is located in its initial position, the shutter disengaging lever 45 is located in a lower position since the roller 46 is pressed by the semicircular portion 42a of the mirror driving cam 42.

A mirror 55 which is pivoted to the side plate 14a by a pivot shaft 54 is provided on the side surface thereof with a mirror seat boss 56 projecting therefrom, which abuts against a mirror return spring 47 provided on the shutter disengaging lever 45. In FIG. 1 in which the shutter disengaging lever 45 is in the lower position, the mirror seat boss 56 is pressed by the mirror return spring 47 so that the mirror 55 is held in a lower position.

When the rotation of the mirror cam gear 26 in the counterclockwise direction takes place in FIG. 1, so that the roller 46 is disengaged from the semicircular portion 42a and can engage with the recessed portion 42b, the shutter disengaging lever 45 is moved upward by the biasing force of the mirror driving spring 49. Consequently, the front end of shutter disengaging lever 45 presses up against the mirror seat boss 56 to thereby move the mirror 55 upward as shown in FIG. 2. Thus, the time at which the upward or downward movement of the mirror 55 occurs is determined in accordance with the rotational movement of the shutter disengaging lever 45 by the mirror driving cam 42 through the cam follower (roller) 46.

The front end of the shutter disengaging lever 45 is connected to a shutter engaging mechanism (not shown) and mechanically engages, in a position shown in FIG. 1, with an electromagnetic focal-plane shutter (not shown) of a single lens reflex camera 10. When the shutter disengaging lever is moved to the upper position shown in FIG. 2, the mechanical engagement is released. The first and second blinds of the electromagnetic focal-plane shutter (referred to as a shutter) are magnetically held by first and second blind magnets 86 and 87 (FIG. 7), respectively. The first blind magnet 86 and the second blind magnet 87 are activated when power is supplied thereto, so that the shutter is held due to the magnetic attraction. When no electrical power is supplied, the first and second blind magnets 86 and 87 are de-energized, so that the first and second blinds of the shutter can be moved.

The shutter/diaphragm cam gear 25 is integrally provided with a pair of unlatching cams (diaphragm disengaging cams) 27 and 28 of different shapes and a shutter charging cam 32. The unlatching cams 27 and 28 are secured to the front surface (in FIGS. 1 through 5) of the shutter/diaphragm cam gear 25 and the shutter charging cam 32 is secured to the rear surface thereof, respectively. The shutter charging cam 32 is provided with a cam shaft portion (small circular portion) 32b around the shaft of the shutter/diaphragm cam gear 25 and a cam arm portion 32a which projects from the cam shaft portion 32b in the radial direction.

The cam arm portion 32a of the shutter charging cam 32 can be engaged by a cam follower (roller) 31 of a shutter charge lever 30 which is pivoted to the side plate 14a by a shaft 29. When the shutter charging cam 32 is rotated in the clockwise direction in FIG. 1, so that the cam arm portion 32a moves the roller 31 upward, the shutter charge lever 30 is rotated upward (in the clockwise direction) as shown in FIG. 3. Conversely, when the cam arm portion 32a is retracted, the shutter charge lever 30 is returned to the lower position shown in FIG. 1. The shutter charge lever 30 is provided on the front end thereof with a shutter charge mechanism (not shown) connected thereto, so that the shutter charging can be effected by the swing movement of the shutter charge lever between the upper and lower positions thereof.

Figure 4:
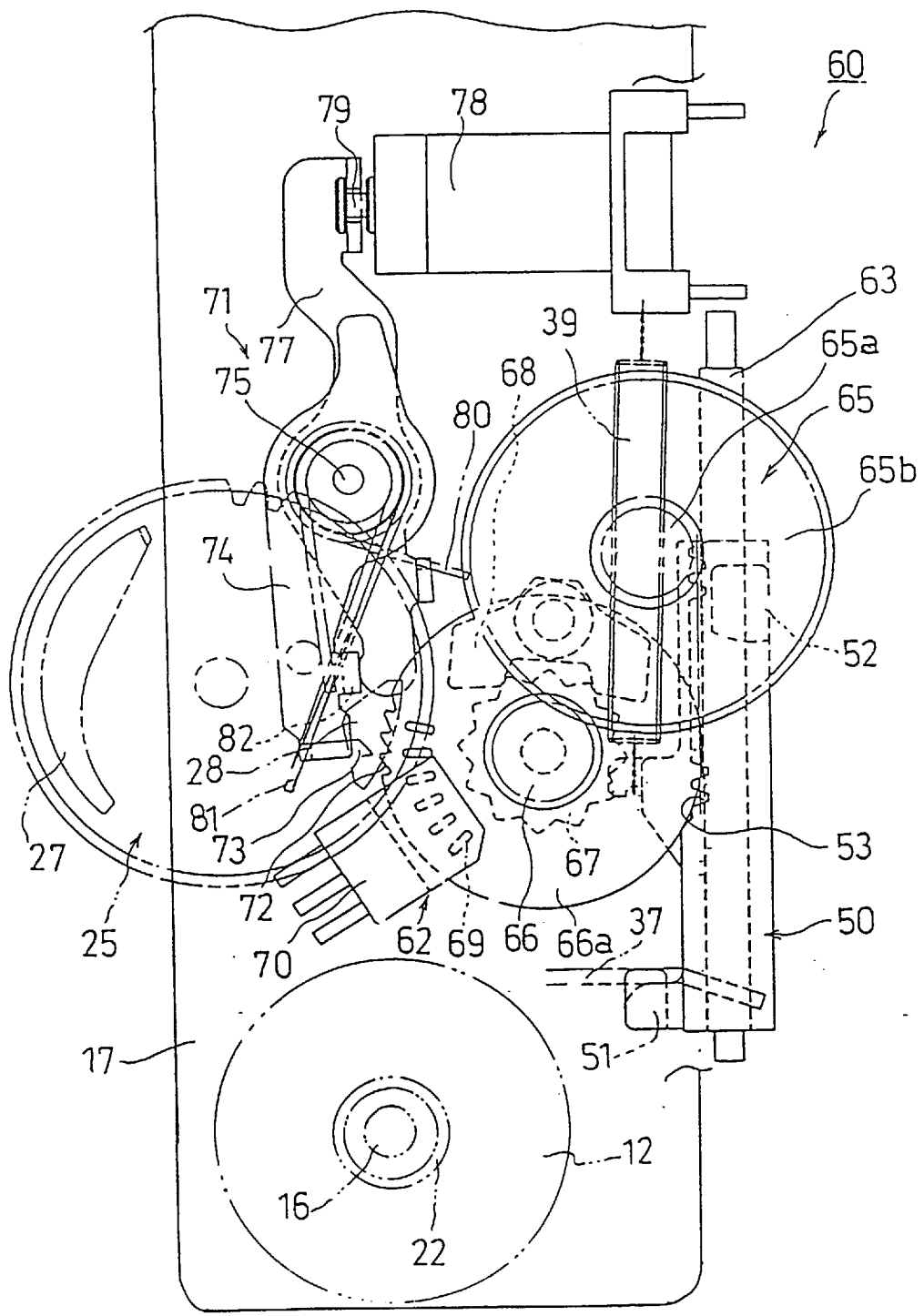
FIG. 4 is a side elevational view of a diaphragm control mechanism when each cam gear is located in an initial position, as viewed from the direction I in FIG. 6.
Figure 5:
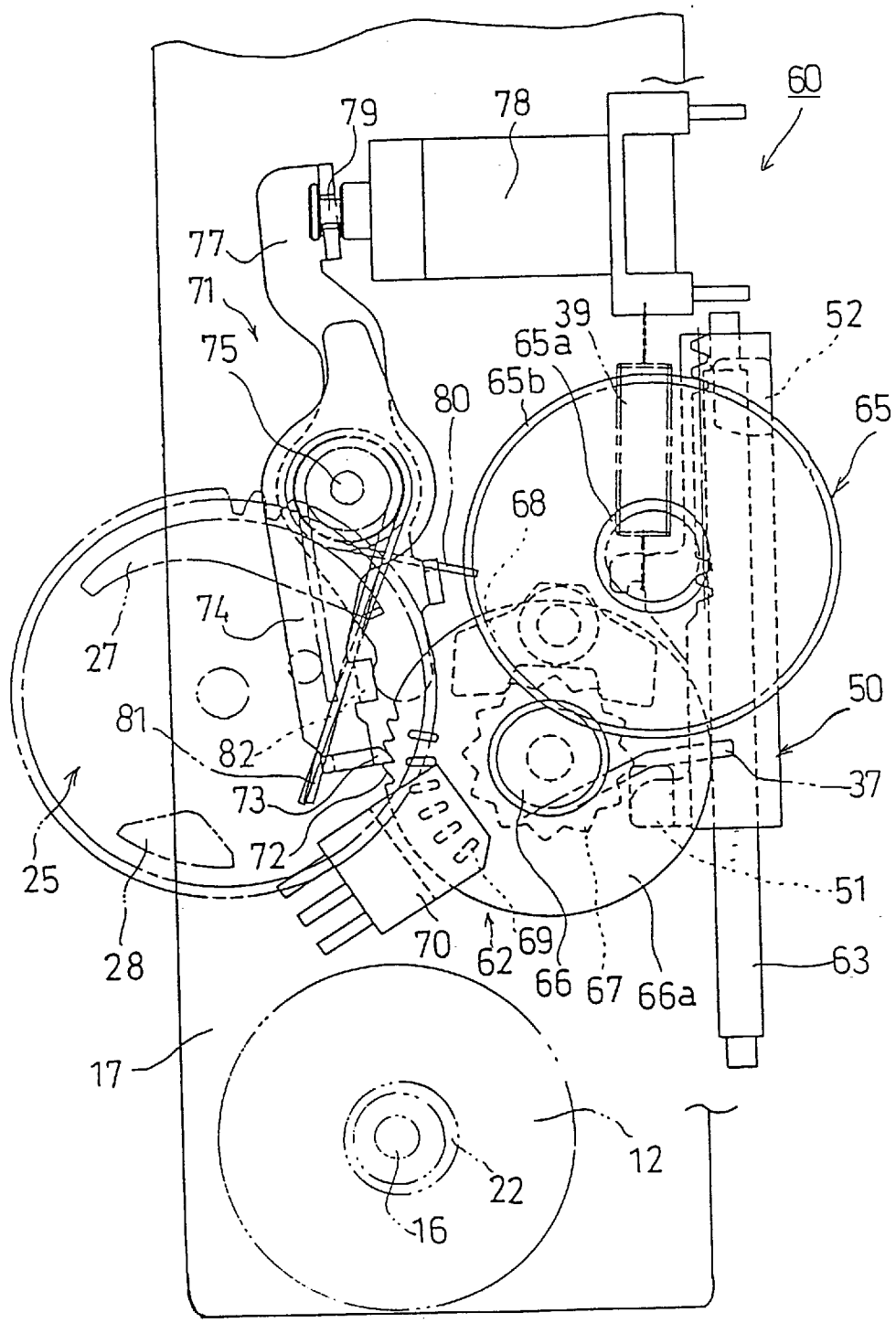
FIG. 5 is a side elevational view of a diaphragm control mechanism in a stop-down position.
Figure 6:
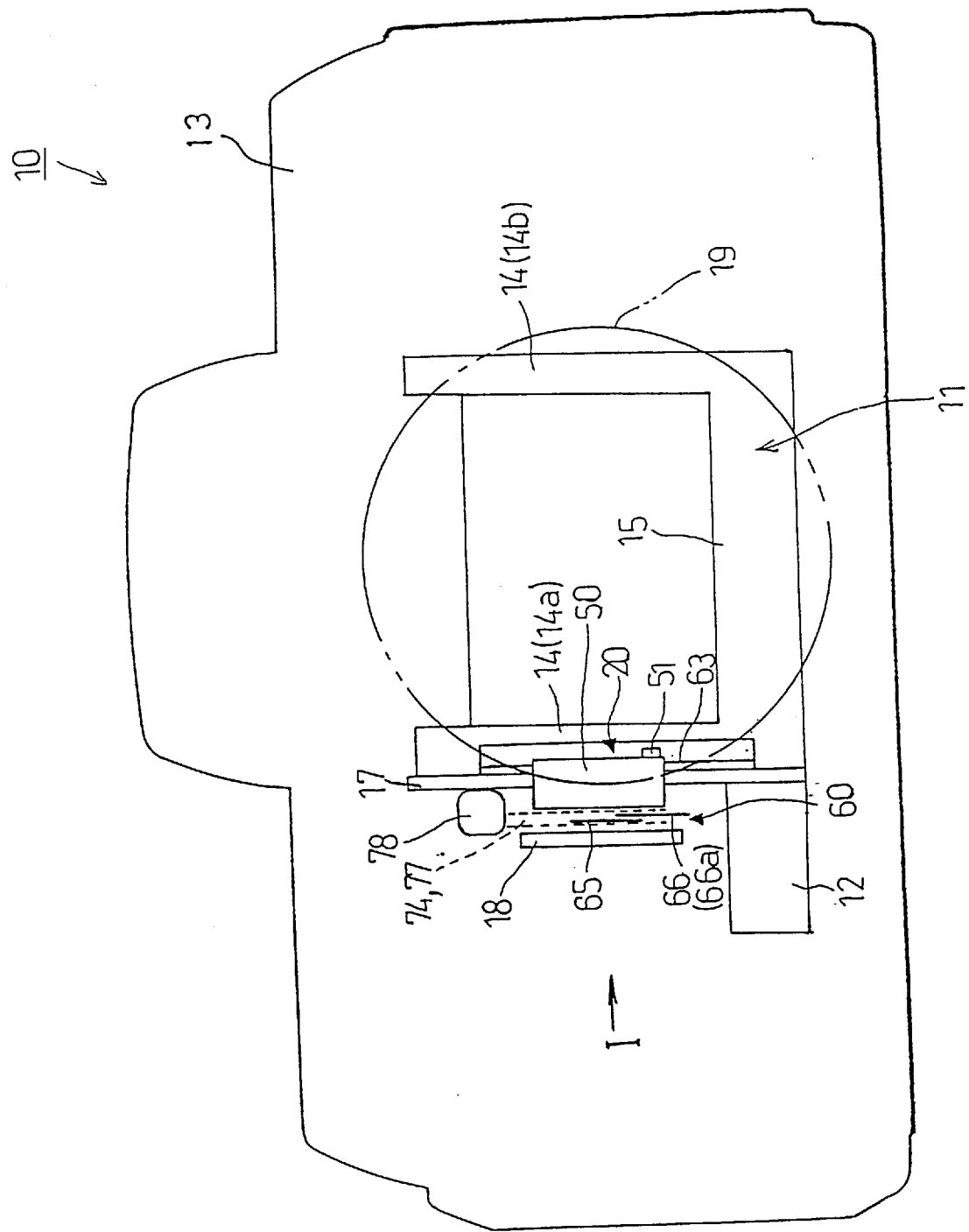
FIG. 6 is a front elevational view of a mirror box, a mechanism driving motor, a mirror drive mechanism, and a diaphragm control mechanism.

The shutter charging cam 32 engages with a cam follower (roller) 35 of a diaphragm set lever 34 which is pivoted to the side plate 14a through a pivot shaft 33. The diaphragm set lever 34 is connected to a diaphragm control mechanism 60. FIGS. 4 and 5 show the diaphragm control mechanism 60 and the intermediate plate 17, viewed from the direction I in FIG. 6. FIGS. 4, 5 and 6 also show the side plate 14a supporting a slider plate 50 which moves up and down along a guide shaft 63 within a predetermined limit. The slider plate 50 is provided on the lower end thereof with an association pin 51 which projects toward the side plate 14a. The association pin 51 projecting in the mirror driving mechanism 20 is engaged by the front end of a diaphragm retainer spring 37 which protrudes from one end of the diaphragm set lever 34. When the diaphragm set lever 34 is in the lower position shown in FIG. 1, the slider plate 50 is held in the lower position shown in FIG. 4 by the diaphragm retainer spring 37.

The diaphragm set lever 34 is biased by a return spring 36 into the upward direction (counterclockwise direction in FIG. 3) in which the cam follower (roller) 35 is always brought into contact with the shutter charging cam 32. Also, the slider plate 50 is biased upward by a spring 39. Consequently, when the shutter charging cam 32 rotates in the clockwise direction in FIG. 1 to separate the cam arm portion 32a from the cam follower 35, the diaphragm set lever 34 is rotated in the upward direction (counterclockwise direction in FIG. 3), so that the diaphragm retainer spring 37 is separated from the association pin 51, thus resulting in the upward movement of the slider plate 50. Note that the diaphragm set lever 34 can be rotated to an uppermost position in which the cam follower 35 abuts against the cam shaft portion 32b of the shutter charging cam 32.

The slider plate 50 is provided with a diaphragm driving projection 52 integral therewith, which always engages with a diaphragm pin (not shown) connected to a diaphragm mechanism (not shown) provided in the lens barrel. Namely, the aperture is-opened when the slider plate 50 is in the lower position shown in FIG. 4, and the aperture size is reduced when the slider plate 50 is moved upward.

The upper position of the slider plate 50 is determined by the diaphragm control mechanism 60 with which the rack 53 thereof engages. The diaphragm control mechanism 60 will be discussed below with reference to FIGS. 4 and 5.

The intermediate plate 17 is provided with a double gear 65 which is rotatably supported thereon and which has a small gear 65a in mesh with the rack 53 of the slider plate 50 and a large gear 65b in mesh with a diaphragm control gear 66. An ankle 68 which is rotatably supported by the intermediate plate 17 engages with an escape wheel 67 coaxial to the diaphragm control gear 66, so that the speed of rotation of the diaphragm control gear 66 is kept constant. The diaphragm control gear 66 is provided on the peripheral surface thereof with a slit disc 66a having slits 69 which are spaced at an equi-angular distance. The slits 69 constitute a pulse generator 62 together with a photo-interrupter 70 having light emitter and light receiver, opposed to each other and located on the opposite sides of the slits 69.

When the slider plate 50 is moved upward in FIG. 1, the diaphragm control gear 66 (slit disc 66a) is rotated through the double gear 65, so that pulses corresponding to the angular displacement of the diaphragm control gear 66 are generated by the photo-interrupter 70. Since the number of pulses corresponds to the upper position (upward displacement) of the slider plate 50, the diaphragm value can be determined by detecting the number of pulses.

The intermediate plate 17 supports a diaphragm engagement mechanism 71 which engages with the diaphragm control gear 66 to stop the upward movement of the slider plate 50 when the slider plate 50 moves to a position corresponding to a set diaphragm value. The diaphragm engagement mechanism 71 is comprised of a latch lever 74 which is pivoted to the intermediate plate 17 through a pivot shaft 75 and which has a latch pin (pawl) 73 which can selectively engage with peripheral teeth 72 of the slit disc 66a, and an armature lever 77 which is coaxial to the latch lever 74 and which engages with a plunger 79 of a diaphragm set magnet 78. The armature lever 77 and the latch lever 74 are biased in the counterclockwise direction by springs 80 and 81 about the shaft 75, respectively.

The diaphragm set magnet 78 can be made of an electromagnet magnet which is demagnetized when it is supplied with an electric current, so that the plunger 79 can be moved forward (project forward or outward). When no power is supplied, the plunger 79 of the diaphragm set magnet 78 is retracted in the magnet housing due to the magnetic attraction against the spring force of the springs 80 and 81, as mentioned above, and hence the latch pin 73 of the latch lever 74 is disengaged from the teeth 72 of the slit disc 66a (FIG. 4). Conversely, if the power is supplied, the plunger 79 of the diaphragm set magnet 78 is free to move forward, so that the latch lever 74 and the armature lever 77 can be rotated in the counterclockwise direction by the spring force of the springs 80 and 81. Consequently, the latch pin 73 is engaged in one of the teeth 72 of the slit disc 66a to stop the rotation of the diaphragm control gear 66 (FIG. 5). Namely, when the number of pulses corresponding to a predetermined diaphragm value is detected, the diaphragm set magnet 78 is supplied with the electric current, so that a predetermined diaphragm value can be obtained. In the following discussion and drawings, the deenergizing of the diaphragm set magnet 78, in response to the power supply, will be referred to as an ON state of the magnet.

The latch lever 74 is provided with a cam follower 82 which can be selectively engaged by unlatching cams 27, 28 of the shutter/diaphragm cam gear 25. When the unlatching cam 27 or 28 presses the cam follower 82 in accordance with the rotation of the shutter/diaphragm cam gear 25, the latch lever 74 is rotated in the clockwise direction. As a result, the latch pin 73 of the latch lever 74 is disengaged from the teeth 72 of the slit disc 66a, so that the slider plate 50 can be moved downward. Thus, the set diaphragm value is released.

When the shutter/diaphragm cam gear 25 is located near the initial position (i.e., full-open aperture) as shown in FIG. 4, the latch pin 73 cannot engage with the teeth 72 of the slit disc 66a since the unlatching cam 28 restricts the rotation of the latch lever 74 in the counterclockwise direction. Therefore, the engagement of the latch pin 73 and the teeth 72 occurs when the unlatching cam 28 is moved from the initial position after the rotation of the shutter/diaphragm cam gear 25 commences. However, since it takes a certain time before the diaphragm in the photographing lens group begins moving, it is possible to fix the diaphragm in a position close to the full open aperture position.

There is a rotation angle detection switch 83 (FIG. 7) between the mirror cam gear 26 and the intermediate plate 17. The detection switch 83 detects the angular displacement of the shutter/diaphragm cam gear 25 and the mirror cam gear 26 and is composed of the detection brush 41 secured to the mirror cam gear 26 and contacts (not shown) with which the detection brush 41 selectively comes into contact. The contacts are provided on the camera body 13. The detection switch 83 detects the angular position of the mirror cam gear 6 in accordance with the selective contact of the brush 41 with the contacts (change in the contact position). Moreover, since the gear ratio between the mirror cam gear 26 and the shutter/diaphragm cam gear 25 is 1:1, the detection switch 83 can also detect the angular position of the shutter/diaphragm cam gear 25. Consequently, the position of the mirror 55 or the charge state of the shutter can be detected.

Figure 7:
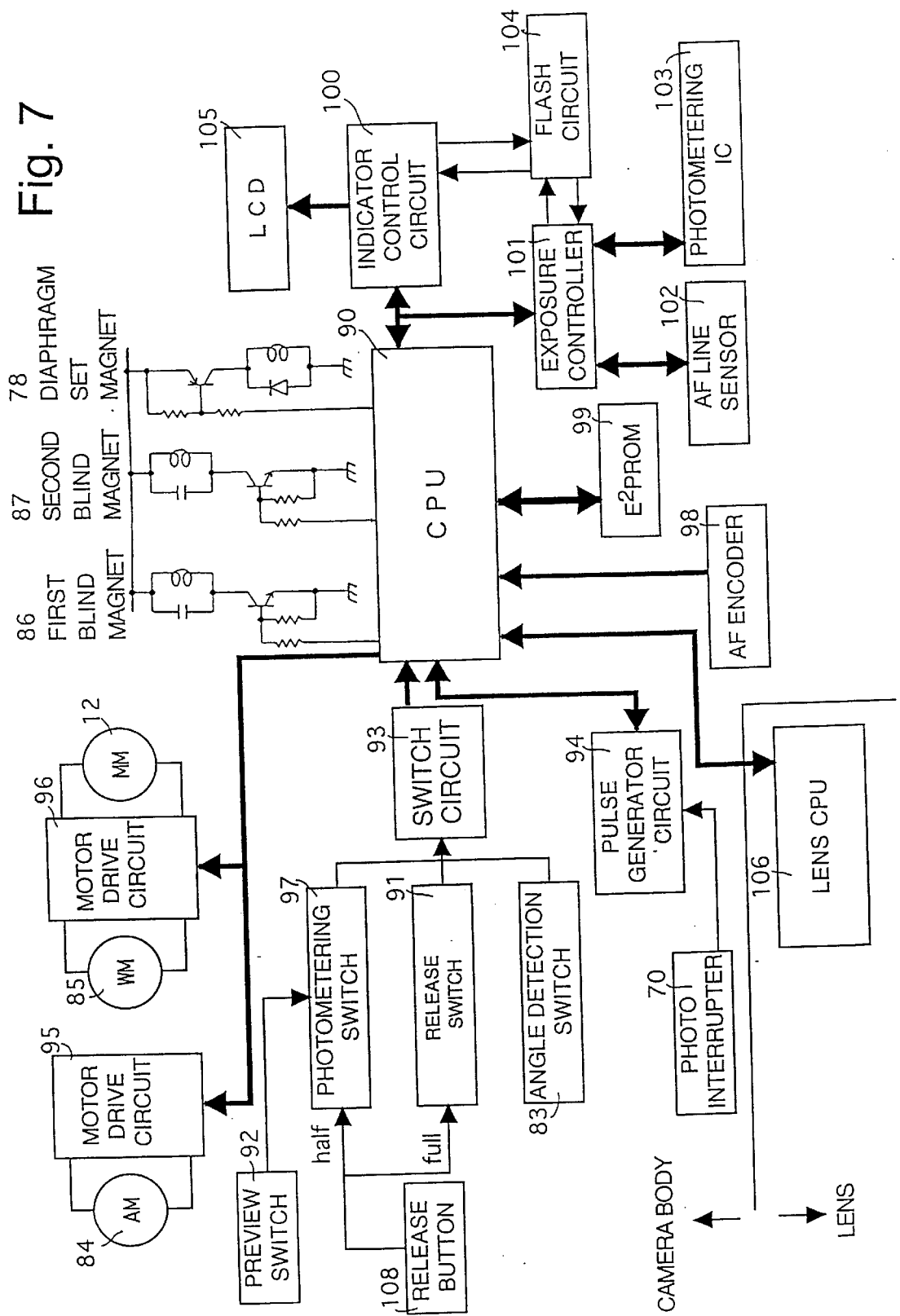
FIG. 7 is a block diagram of a control system.

FIG. 7 shows a block diagram of a control system of the camera according to the present invention. The CPU 90 provided in the single lens reflex camera 10 generally controls the photographing operation in association with the lens CPU 106 provided in the lens barrel and carries out each control operation in accordance with programs stored in an internal memory.

Connected to the CPU 90 are: a motor drive circuit 95 for the AF motor 84 to drive the focusing lens group in the photographing lens barrel, a film winding and rewinding motor 85, a motor drive circuit 96 for the motor 12, the first and second blind magnets 86 and 87 for magnetically holding the first and second blinds of the shutter, and the diaphragm set magnet 78 for fixing the diaphragm.

Also connected to the CPU 90 are: a pulse generator circuit 94 for the pulse generator 62, an AF encoder 98, an EEPROM 99 which stores information such as the number of film frames or various correction values, etc., an indicator control circuit 100 which controls an indication device such as an LCD 105 or a flash circuit 104, and an exposure control device 101 which is connected to an AF line sensor 102 and a photometering IC 103 to control the object distance measuring operation and the photometering operation of the CPU 90. The flash circuit 104 has a flash charging circuit, a trigger circuit and a quenching circuit, incorporated therein. The LCD 105 includes an indicator provided within a view finder and an external indicator.

A switch circuit 93 which performs the input operation of the release switch 91, the preview switch 92, the photometering switch 97 and the angle detection switch 83, etc., is also connected to the CPU 90. The camera 10 is provided with a release button 108 which projects from the camera body 13 so that the release button can be externally actuated. When the release button 108 is depressed by half step, the photometering switch 97 is turned ON and when the release button 108 is depressed by full step, the release switch 91 is turned ON.

The camera 10 is also provided with the preview switch 92 separate from the release button 108. The preview switch 92 which can be actuated from outside is turned ON when it is depressed and is turned OFF when the depression is released. The preview switch 92 is connected to the photometering switch 97, so that when the preview switch 92 is turned ON, the photometering switch 97 is turned ON.

Namely, the photometering switch 97 is turned ON when the release button 108 is depressed by half step or when the preview switch 92 is turned ON. The angle detection switch 83 inputs data on the operation state of the mirror driving mechanism 20, to the switch circuit 93 as a switch signal.

The camera body 13 of the camera 10 is provided with a shutter speed setting dial (not shown) which can be actuated externally. The photographing lens barrel to be attached to the camera 10 is provided on the outer peripheral surface thereof with a diaphragm setting ring (not shown). When the shutter speed setting dial and the diaphragm setting ring are set to an automatic set mode, the program AE mode (automatic exposure mode) is established in which the exposure can be automatically controlled when the release switch 91 is actuated.

If the diaphragm setting ring has been set to a position other than an auto mode when the shutter speed setting dial is set to an auto mode, a diaphragm priority AE mode is obtained in which the shutter speed is automatically determined by the CPU 90. Conversely, if the shutter speed setting dial has been set to a position other than an auto mode when the diaphragm setting ring is set to an auto mode, a shutter priority AE mode is obtained in which the diaphragm value is automatically determined by the CPU 90. In these AE modes, the CPU 90 controls the exposure in accordance with the photometering data at the full-open aperture position. If the diaphragm setting ring and the shutter speed setting dial are set to desired positions other than an auto mode, a manual exposure mode is obtained in which the photographing operation is carried out at the set diaphragm value and shutter speed.

The camera 10 includes an automatic focusing system AF which detects an amount of defocus with respect to an object to be photographed and moves the focusing lens group within the photographing lens barrel to eliminate the defocus. The camera 10 of the illustrated embodiment has two modes which can be selected by a focus mode selection switch (not shown) which can be actuated from the outside of the camera body 13. The two modes are an AF mode in which the automatic focusing is automatically effected by the CPU 90 and an MF mode in which the focusing can be manually effected by a photographer. When the photometering switch 97 is turned ON at the AF mode, the CPU 90 drives the motor drive circuit 95 to move the focusing lens group in accordance with the defocus detected by the AF line sensor 102 per se known, which constitutes an object distance measuring unit. The CPU 90 counts the number of pulses output from the AF encoder 98 in association with the rotation of the AF motor 84. When the counted number reaches a predetermined value, the CPU 90 stops the rotation of the AF motor 84. This is an automatic focusing operation (referred to as an AF operation).

The operation sequence of the camera having a preview apparatus will be discussed below with reference to FIGS. 8–9 (timing charts) and FIGS. 10–14 (flow charts). Note that in the following discussion, it is assumed that the program AE mode and the AF mode are selected.

Figure 10:
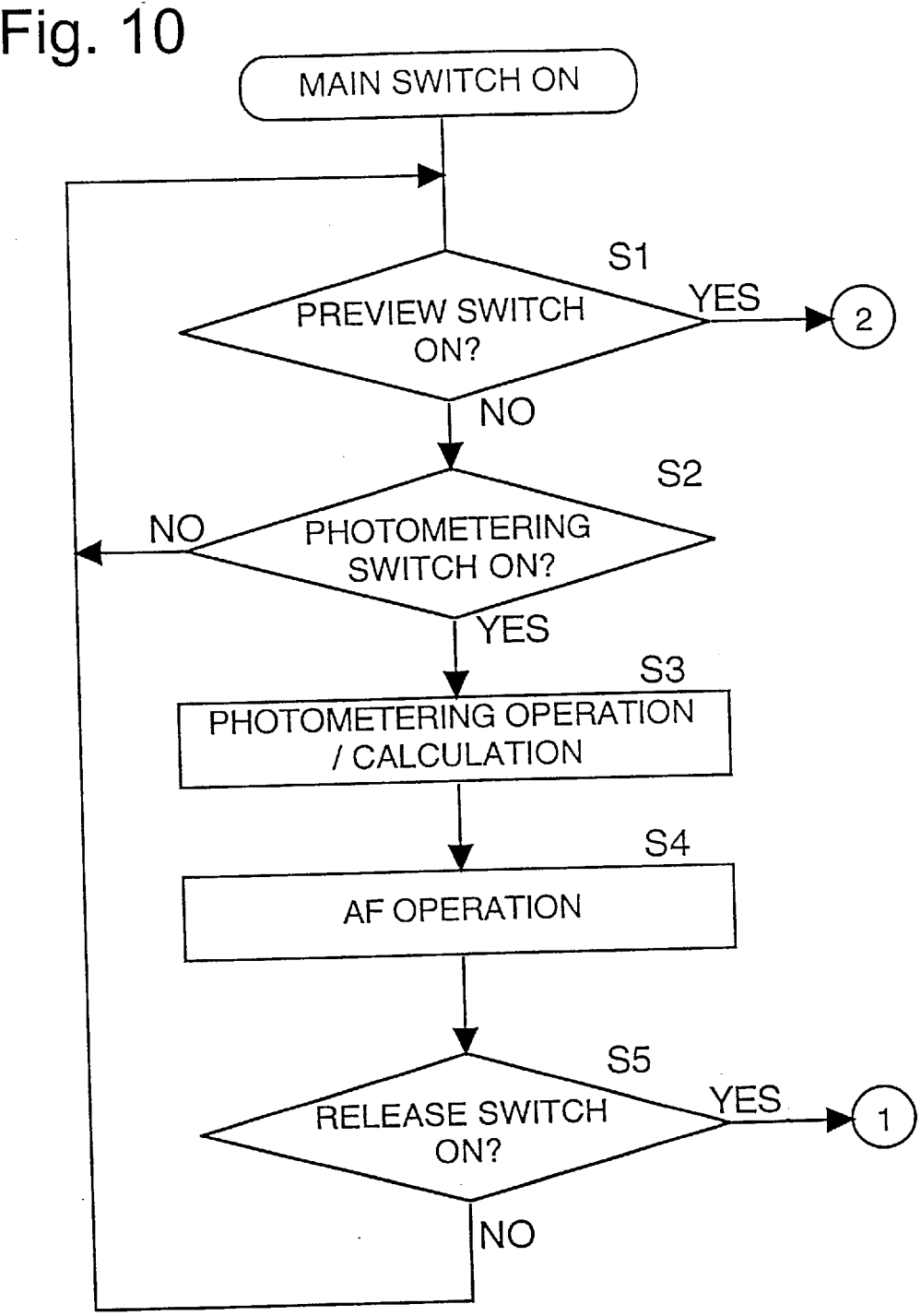
FIG. 10 is a flow chart of an initialization operation.
Figure 11:
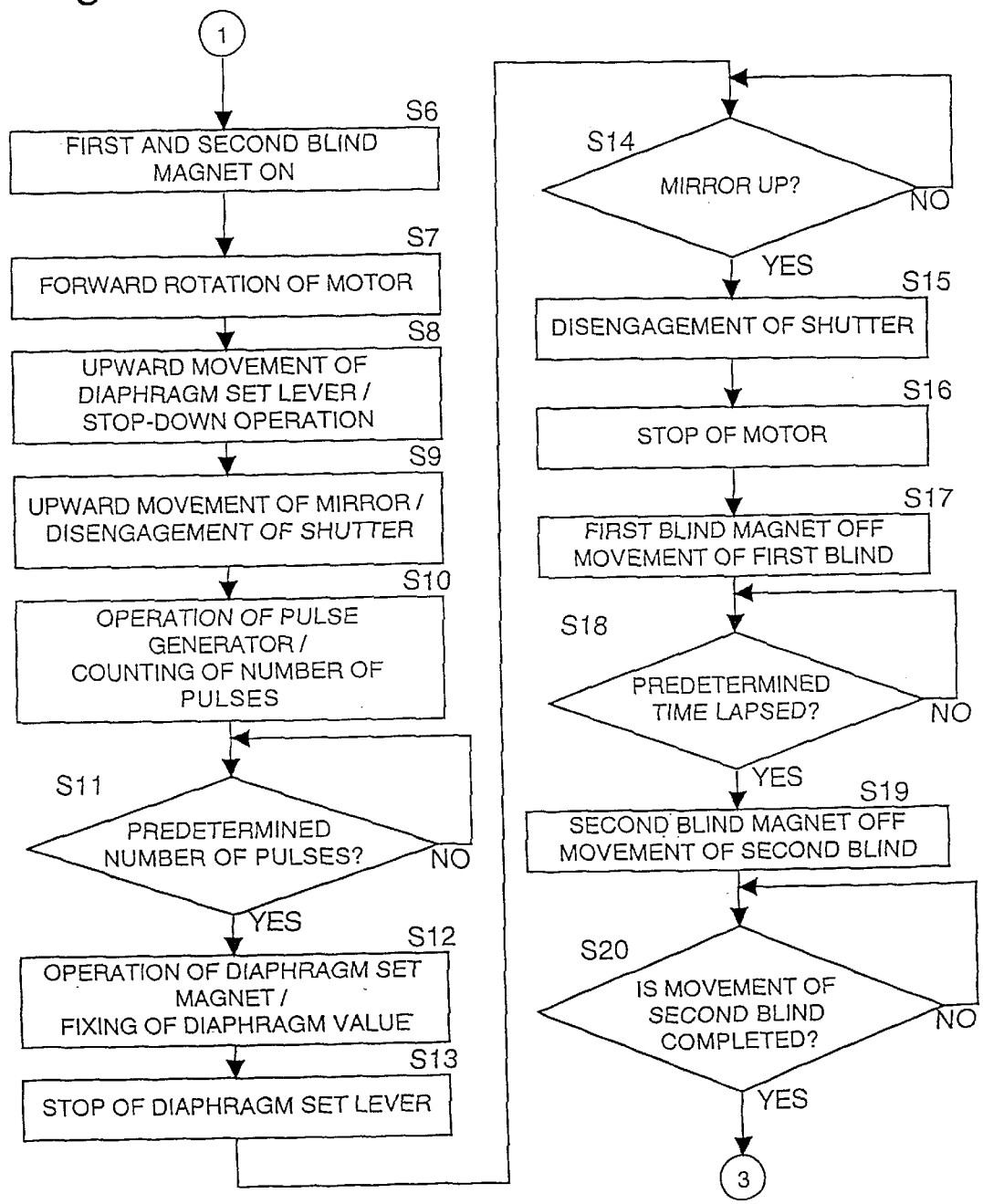
FIG. 11 is a flow chart of operations before the movement of a shutter upon normal releasing.
Figure 12:
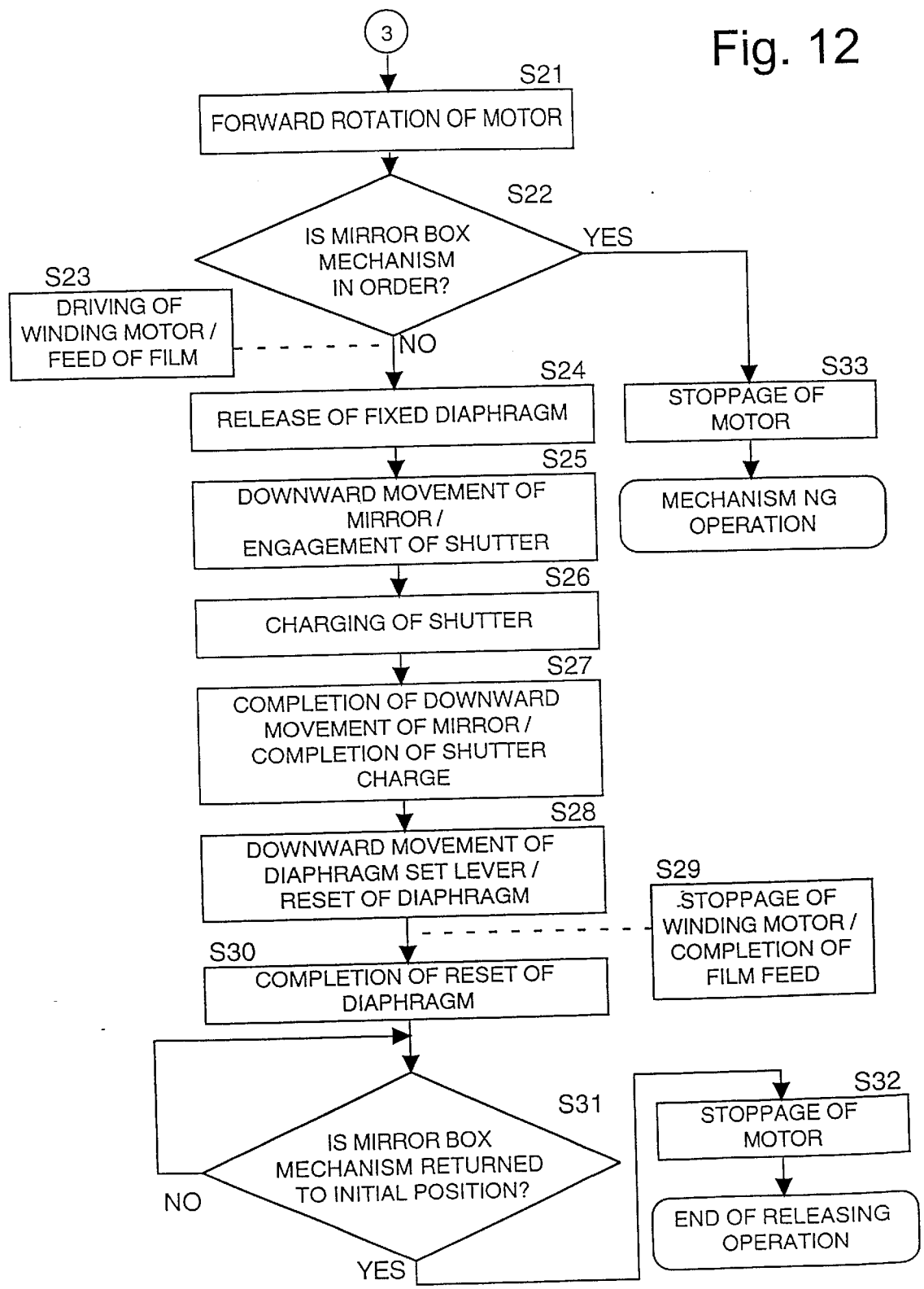
FIG. 12 is a flow chart of operations after the movement of a shutter upon normal releasing.

When the main switch of the camera 10 is turned ON, the control enters the routine shown in FIG. 10. The photographer determines whether or not the preview operation should be performed. If the previewing should be executed, the preview switch 92 is actuated (step S1). If the preview switch 92 is turned ON, the control proceeds to the preview operation shown in FIGS. 13 and 14.

If the previewing is unnecessary, a check is made to confirm whether the photometering switch 97 has been turned ON by the half-depression of the release button 108 (S2). If the photometering switch 97 has been turned ON, the photometering operation (calculation) is carried out to automatically set appropriate diaphragm value and shutter speed (S3). Consequently, the CPU 90 actuates the AF motor 84 through the motor drive circuit 95 to perform the AF operation (S4). If no photometering switch 97 has been turned ON at step S2, the control is returned to wait for a next preview operation. After the AF operation at step S4, a check is made to confirm whether the release switch 91 has been turned ON (S5). If the release switch 91 has been turned ON by the full-depression of the release button 108, the control enters the routine shown in FIGS. 11 and 12 (normal release operation). If the release switch 91 is not ON at step S5, the control is returned after a lapse of a predetermined time from the release of the half-depression of the release button 108.

The following discussion will be addressed to the photographing operation without a preview.

If the release switch 91 is turned ON at step S5, the release signal is supplied to the CPU 90 through the switch circuit 93; the CPU 90 drives the first blind magnet 86 and the second blind magnet 87 in response to the release signal so that the shutter can be magnetically held in place (S6).

The mirror drive mechanism 20 and the diaphragm control mechanism 60 are kept in the initial position shown in FIGS. 1 and 4 before the control proceeds to step S6. Namely, the mirror 55 is located in the lower position (located in the light path); the shutter has been charged by the shutter charging lever 30; and the diaphragm set lever 34 is located in the lower position, so that the diaphragm of the photographing lens is open.

If the shutter is magnetically held at step S6, the CPU 90 drives the motor 12 in the forward direction (i.e., in the counterclockwise direction of the pinion 22 in FIG. 1) through the motor drive circuit 96 (S7). If the forward rotation of the motor 12 takes place, the rotation is reduced by the reduction gear train comprised of gears 24a through 24d and is transmitted to the shutter/diaphragm cam ear 25 and the mirror cam gear 26 to rotate the shutter/diaphragm cam gear 25 and the mirror cam gear 26 in the clockwise direction and in the counterclockwise direction by the same angular displacement, respectively.

Since the direction of the rotation of the cam gears 25 and 26 caused when the motor 12 rotates in the forward direction is referred to as a "forward direction" in the illustrated embodiment, the actual "forward directions" of the intermeshing cam gears 25 and 26 differ from each other. The same is true when the motor 12 is reversed. Namely, when the motor 12 is reversed, the "reverse directions" of the cam gears 25 and 26 are opposite.

The rotation (upward movement) of the diaphragm set lever 34 is caused by the forward rotation of the shutter/diaphragm cam gear 25 (in the clockwise direction) to execute the stop-down operation (to reduce the aperture) at step S8. Namely, since the cam arm-portion 32a of the shutter charging cam 32 is disengaged from the cam follower (roller) 35, the diaphragm set lever 34 is rotated upward in the counterclockwise direction in FIG. 1 by the spring force of the return spring 36. The upward movement of the diaphragm set lever 34 causes the slider plate 50 which has been restricted by the retainer spring 37 to move upward due to the spring force of the spring 39, so that the stop-down operation by the diaphragm mechanism of the photographing lens is commenced.

At the same time, the shutter disengaging lever 45 is moved (rotated) upward by the rotation of the mirror cam gear 26 in the counterclockwise direction (forward direction), so that the upward movement of the mirror 55 and the disengagement of the shutter occur (S9). Namely, since the semicircular portion 42a of the mirror drive cam 42 is retracted, the shutter disengaging lever 45 is rotated in the clockwise direction by the spring force of the mirror drive spring 49. As a result, the mechanical engagement of the shutter engagement mechanism is released and the mirror seat boss 56 is moved upward to move the mirror 55 upward.

When the rotation of the diaphragm control gear 66 takes place in association with the stop-down operation, the pulses are generated by the pulse generator 62 in synchronization with the stop-down operation. The CPU 60 counts the number of the pulses (S10). The number of the pulses is monitored until the number reaches a predetermined value corresponding to the diaphragm value set at step S3. If the number of pulses reaches the predetermined value, the CPU 90 gives the command to supply he diaphragm set magnet 78 with an electric current to deenergize (turn ON) the same. Consequently, the latch pin 73 engages with one of the teeth 72 of the slit disc 66a to thereby stop the upward movement of the slider plate 50. Thus, the diaphragm is fixed at a set value (S12).

Since the diaphragm set lever 34 can be moved up until the cam follower (roller) 35 abuts against the cam shaft portion 32b of the shutter charging cam 32, the diaphragm set lever 34 stops the upward movement for a predetermined time after the fixing of the diaphragm of the photographing lens (S13).

Thereafter, the completion of the upward movement of the mirror 55 is detected by the angle detection switch 83 (S14). If the upward movement of the mirror 55 is completed, the angle detection switch 83 supplies the mirror-up signal to the switch circuit 93. In this state, the shutter disengaging lever 45 completes the upward movement (rotation) and thus the mechanical engagement of the shutter is released (S15). The CPU 90 stops the operation of the motor 12 (S16). At step S16, the mirror drive mechanism 20 and the diaphragm control mechanism 60 are moved to the position shown in FIGS. 2 and 5, respectively.

After the stoppage of the motor 12, the first blind magnet 86 is turned OFF, so that the first blind of the shutter which has been disengaged is moved (S17). Thereafter, the lapse of time in which the shutter is opened in accordance with the set shutter speed is checked (S18). After the lapse of a predetermined time, the second blind magnet 87 is turned OFF, so that the second blind of the shutter is moved (S19). Upon completion of the movement of the second shutter blind (S20), the return operation and the winding operation are carried out.

The motor 12 is rotated again in the forward direction through the motor drive circuit 96 after the movement of the shutter (S21). If no mirror-up signal disappears even after the lapse of a predetermined time from the commencement of the operation of the motor 12, it is judged that the mirror drive mechanism 20 is out of order (S22). Consequently, the motor 12 is stopped (S33) and the control enters the mechanism NG operation. If no disorder of the operation is detected, the motor 12 continues rotating in the forward direction. At the same time, the winding motor 85 is driven by the motor drive circuit 96 to wind the film (S23).

When the shutter/diaphragm cam gear 25 is rotated in the clockwise direction in FIG. 2, the unlatching cam 27 presses the cam follower 82 and hence, the latch pin 73 of the latch lever 74 is disengaged from the teeth of the slit disc 66a, so that the diaphragm is released (S24). Since the diaphragm set lever 34 is located in the upper position, the slider plate 50 which has been released from the diaphragm engagement mechanism 71 is moved by the spring force of the spring 39 to a position in which the aperture size is smallest (FIG. 8).

At the same time, the semicircular portion 42a of the mirror drive cam 42 presses the cam follower 46 in accordance with the rotation of the mirror cam gear 26 in the counterclockwise direction. Consequently, the shutter disengaging lever 45 is moved (rotated) downward, so that the shutter is mechanically engaged and the mirror 55 is moved downward (S25).

When the shutter/diaphragm cam gear 25 is further rotated, the cam arm portion 32a of the shutter charging cam 32 moves the cam follower (roller) 31 upward, so that the shutter charge lever 30 is moved (rotated) upward to charge the shutter (S26).

If the cam follower (roller) 46 of the shutter disengaging lever 45 is moved downward by the semicircular portion 42a of the mirror drive cam 42 before the shutter is charged, the downward movement of the mirror 55 has been completed (S27). The mechanical engagement of the shutter has been also completed at step S27. Thereafter, the rotation of the shutter/diaphragm cam gear 25 in the clockwise direction continues. The diaphragm set lever 34 is continuously moved downward by the cam arm portion 32a of the shutter charging cam 32 after the shutter charging operation has been completed. Hence, the diaphragm reset operation commences (S28). During the diaphragm reset operation, the mirror cam gear 26 continues rotating in the counterclockwise direction, but since the semicircular portion 42a of the mirror drive cam 42 contacts with the cam follower roller 46 over substantially half the entire periphery thereof, the mirror 55 is held in the lower position.

Figure 8:
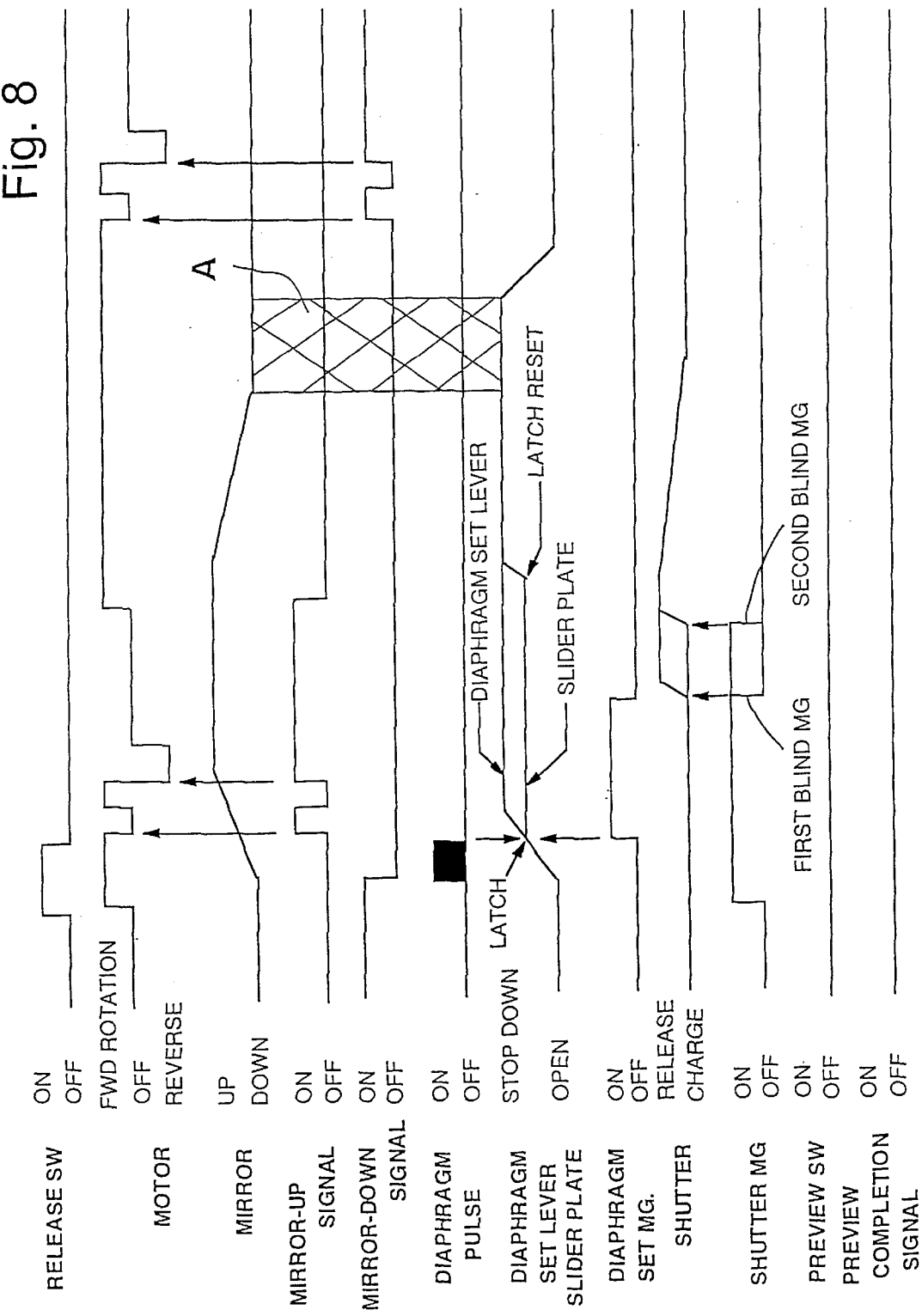
FIG. 8 is a timing chart of a normal release operation.
Figure 9:
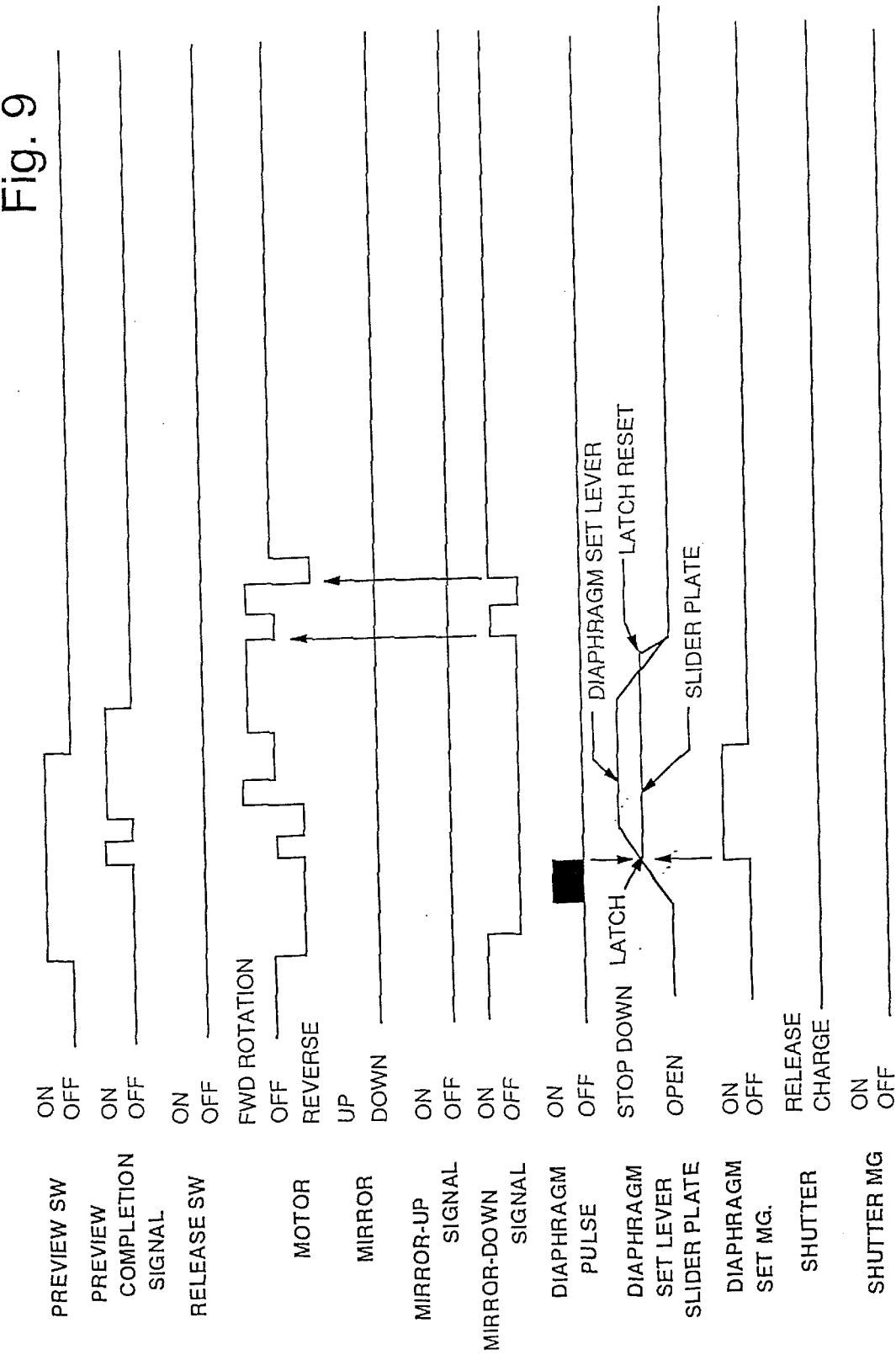
FIG. 9 is a timing chart of a preview operation.

Namely, there is a time lag between the termination of the downward movement of the mirror 55 (S27) and the commencement of the downward movement (rotation) of the diaphragm set lever 34 (stop-down operation) (S28), as indicated by a hatched portion "A" in FIG. 8. The time lag is produced due to a difference in the shape between the shutter charging cam 32 and the mirror drive cam 42.

The feed of the film by the winding motor 85 is terminated before the shutter/diaphragm cam gear 25 and the mirror cam gear 26 are rotated by one turn and are returned to their initial positions shown in FIG. 1 (S29). The film winding operations when there remains an unexposed film frame(s) and when all the film frames have been exposed differ. However, since the film winding operation does not directly relate to the subject of the present invention, no detailed explanation therefor is given herein.

When the shutter/diaphragm cam gear 25 (and the mirror cam gear 26) rotate by a single revolution, the downward movement of the diaphragm set lever 34 is completed and the aperture is opened (S30). The CPU 90 detects using the angle detection switch 83 that the shutter/diaphragm cam gear 25 and the mirror cam gear 26 have been returned to the respective initial positions shown in FIG. 1 (S31). When the shutter/diaphragm cam gear 25 and the mirror cam gear 26 are returned to the respective initial positions, the rotation of the motor 12 in the forward direction is stopped (S32). Thus, the release operation is completed.

The following discussion will be addressed to the preview.

Figure 13:
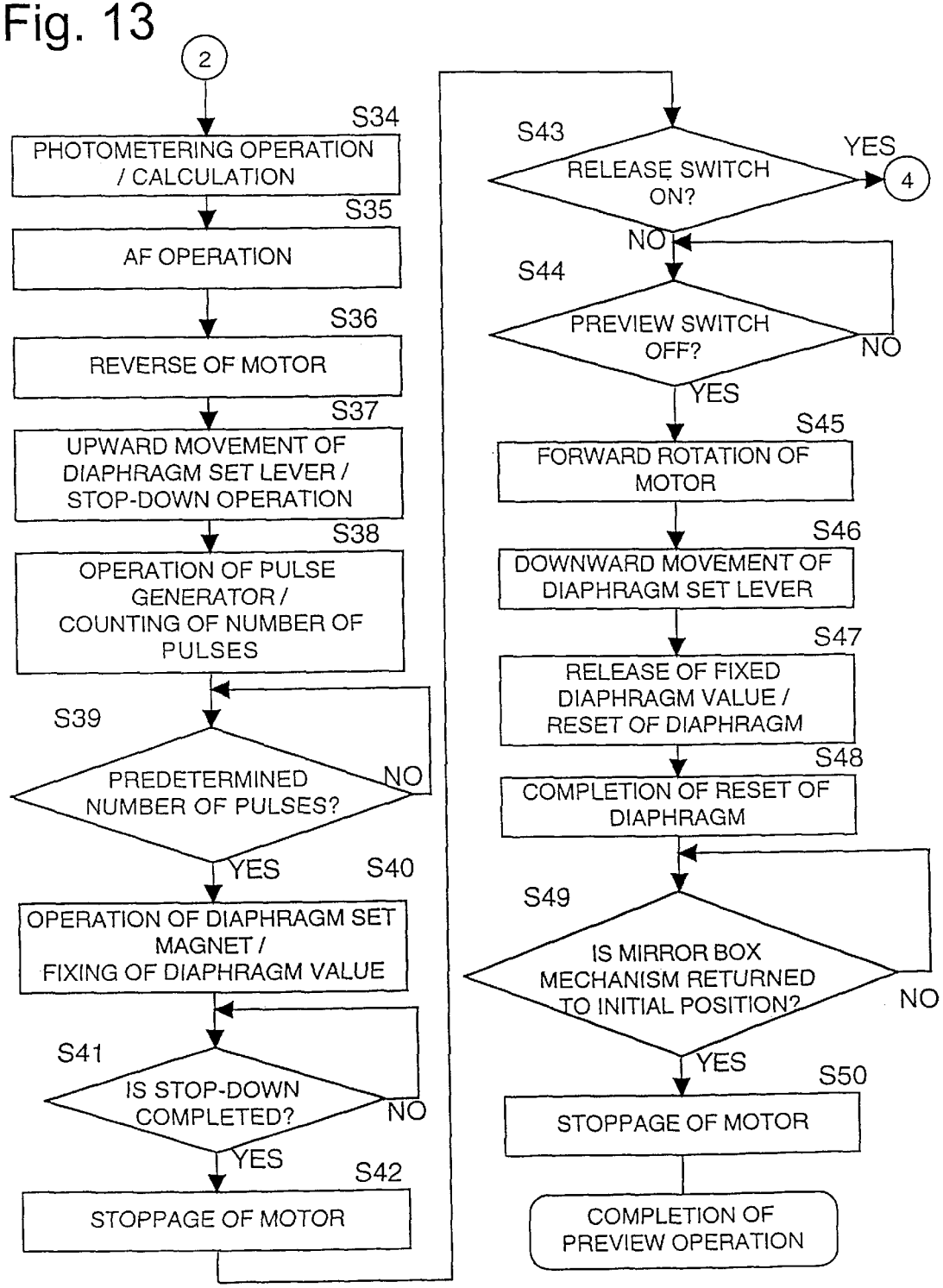
FIG. 13 is a flow chart of a preview operation.

If the preview switch 92 is turned ON at step S2 in FIG. 10, the control enters the routine shown in FIG. 13. If the photometering switch 97 is turned ON in association with the operation of the preview switch 92, the photometering operation (calculation) is carried out to set the diaphragm value (S34), so that the CPU 90 drives the AF motor 84 through the motor drive circuit 95 (S35). Thus, the AF operation is carried out. In this state, the mirror drive mechanism 20 and the diaphragm control mechanism 60 are in the initial positions shown in FIGS. 1 and 4.

Thereafter, the CPU 90 reverses the motor 12 (in the clockwise direction of the pinion 22 in FIG. 1) through the motor drive circuit 96 (S36). If the motor 12 is reversed, the rotation is reduced by the reduction gear train (gears 24a through 24d) and is transmitted to the shutter/diaphragm cam gear 25 and the mirror cam gear 26, so that the shutter/diaphragm cam gear 25 and the mirror cam gear 26 are rotated in the counterclockwise direction and in the clockwise direction, respectively. The direction of the intermeshing cam gears 25 and 26 caused by the rotation of the motor 12 in the reverse direction is referred to as a "reverse direction". Therefore, the "reverse directions" of the intermeshing cam gears 25 and 26 are opposite. As mentioned before, in the normal release which is carried out by the rotation of the motor 12 in the forward direction, the diaphragm reset operation begins after the exposure operation has been completed and after the downward movement of the mirror 55 has been completed. If the motor 12 is reversed, the stop-down operation is effected before the upward movement (rotation) of the mirror 55 takes place, in accordance with a sequence different from that of the operations caused by the forward rotation of the motor 12 (S37).

The operations of the mirror drive mechanism 20 and the diaphragm control mechanism 60 in accordance with the reverse of the motor 12 will be discussed below.

If the shutter/diaphragm cam gear 25 is rotated in the counterclockwise direction (reverse direction) in FIG. 1, the cam arm portion 32a of the shutter charging cam 32 is moved away from the cam follower roller 35 of the diaphragm set lever 34. Consequently, the diaphragm set lever 34 is rotated in the counterclockwise direction by the spring force of the return spring 36. The upward movement (rotation) of the diaphragm set lever 34 causes the slider plate 50 to move upward, so that the stop-down operation is carried out.

At the same time, the mirror cam gear 26 rotates in the clockwise direction (reverse direction), but since the semicircular portion 42a of the mirror drive cam 42 is in contact with the cam follower (roller) 46 over substantially half the peripheral surface thereof, no upward movement (rotation) of the shutter disengaging lever 45 occurs. Namely, the shutter is mechanically engaged and no upward movement of the mirror 55 takes place.

If the slider plate 50 moves upward, the pulse generator 62 generates pulses the number of which is counted by the CPU 90 (S38) which monitors the same in connection with the set diaphragm value (S39). If the number of pulses reaches a value corresponding to the set diaphragm value, the diaphragm set magnet 78 is supplied with electric current (turned ON), so that the latch pin 73 of the latch lever 74 engages with one of the teeth 72 of the slit disc 66a to stop the movement of the slider plate 50 (S40). If the set diaphragm value is obtained (S41), the motor 12 is stopped (S42).

In this state, the position of the mirror drive mechanism 20 is as shown in FIG. 3. The mirror 55 is held in the lower position in which it is located in the light path of the photographing lens, and hence the photographer can confirm the depth of field through the view finder. Moreover, since the AF operation has been carried out at step S35, the depth of field can be confirmed at a composition established after the AF operation. Note that the diaphragm set lever 34 is moved (rotated) to the upper position in which the cam follower roller 35 abuts against the cam shaft portion 32b of the shutter charging cam 32.

In this state, the photographer can turn the release switch 91 ON to take a picture (S43). The photographing operation will be discussed hereinafter with reference to FIG. 14.

If no release switch 91 is turned ON at step S43, the control proceeds to step S44 to check whether or not the preview switch 92 is turned OFF. If the preview switch 92 is turned OFF, the motor 12 is rotated in the forward direction (S45). Consequently, the shutter/diaphragm cam gear 25 is rotated in the clockwise direction, so that the cam arm portion 32a of the shutter charging cam 32 presses the follower roller 35 downward to thereby move (rotate) the diaphragm set lever 34 downward (S46). Furthermore, since the unlatching cam 28 provided on the shutter/diaphragm cam gear 25, which rotates in the clockwise direction, presses the cam follower 82, the latch pin 73 is disengaged from the teeth 72 of the slit disc 66a, so that the diaphragm which has been fixed can be varied. Consequently, the slider plate 50 is moved down by the diaphragm retainer spring 37 to open (reset) the aperture (S47).

If the shutter/diaphragm cam gear 25 is returned to the initial position, the opening operation of the diaphragm is completed (S48). A check is made to confirm whether the mirror drive mechanism 20 has returned to the initial position shown in FIG. 1 by the angle detection switch 83 (S49). If the mirror drive mechanism is returned to the initial position, the motor 12 is stopped (S50) and thus the preview operation is completed.

Figure 14:
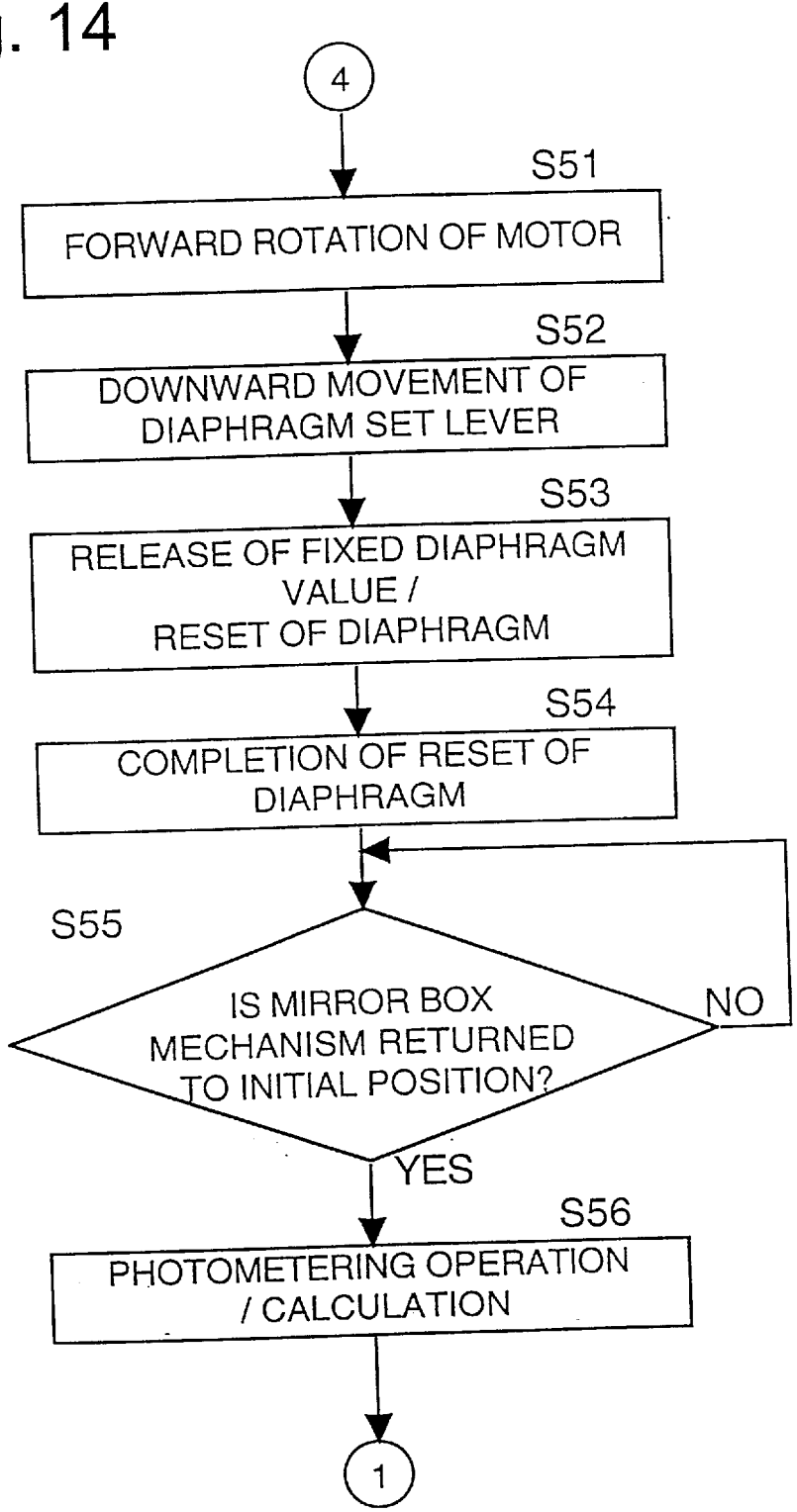
FIG. 14 is a flow chart of operations when a release switch is turned ON during the preview operation.

If the release switch 91 is turned ON at step S43, i.e., if the release switch is turned ON during the preview operation, the control enters the routine shown in FIG. 14. In the routine shown in FIG. 14, the motor 12 in FIG. 3 is rotated in the forward direction (counterclockwise direction of the pinion 22) at step S51. Consequently, the shutter/diaphragm cam gear 25 is rotated in the forward direction, so that the shutter charging cam 32 presses the follower roller 35 downward to move (rotate) the diaphragm set lever 34 (S52). Consequently, the latch is unlatched by the unlatching cam 28, so that the diaphragm which has been fixed is free to vary (S53). If the shutter/diaphragm cam gear 25 is returned to the initial position, the diaphragm set lever 34 is moved to the lower position, and hence the diaphragm is opened (S54). A check is made to confirm whether the mirror drive mechanism 20 has returned to the initial position shown in FIG. 1 using the angle detection switch 83 (S55). The operations mentioned above are identical to those of steps S45 through S49, performed when the preview switch 92 is turned OFF without actuating the release switch 91.

If the shutter/diaphragm cam gear 25 and the mirror cam gear 26 are returned to their respective initial positions, the photometering operation is carried out at the full-open aperture (S56). Thereafter, the control enters the routine shown in FIG. 11 to perform the normal releasing operation.

Note that the cam gears 25 and 26 can be rotated in the forward direction by one revolution without stopping the same at the initial positions. In this case, the photometering operation at step S55 is carried out when the cam gears 25 and 26 are returned to the initial positions, and during this operation, the motor 12 continues rotating.

As can be seen from the above discussion, in the present invention, if the release switch 91 is turned ON during the preview operation, the photometering operation is carried out when the cam gears 25 and 26 are returned to their initial positions (S56), and thereafter, the release operation is carried out by the a single revolution of the cam gears 25 and 26 in the forward direction. Consequently, at the AE mode, the exposure can be controlled based on the latest photometering data and not on the old or previous photometering data obtained when the preview switch 29 has been turned ON (S34) or when the stop-down operation has been carried out. Therefore, a precise and effective automatic exposure can be ensured.

Moreover, since the preview operation is executed by the rotation of the cam gears 25 and 26 from the initial positions in the reverse direction, the release operation can be easily carried out only by rotating the cam gears from the preview position in the forward direction without reciprocally rotating the cam gears 25 and 26 between the preview position and the initial positions. Consequently, the time lag between the release operation and the movement of the shutter can be reduced. Here, it should be noted that the cam gears 25 and 26 are not stopped at the initial positions, and hence a quick response to the movement of the shutter can be achieved.

Although the program AE mode is selected in the illustrated embodiment, the present invention can be also applied when a diaphragm priority AE mode or a shutter priority AE mode is selected.

As may be understood from the foregoing, according to the present invention, a control method of a single lens reflex camera having a preview function can be provided in which the exposure can be precisely controlled if the release switch is turned ON during the preview operation.

What is claimed is:

1. A method for controlling a single lens reflex camera having a preview function, said camera comprising:

a mirror drive mechanism which moves a mirror between a lower position in which the mirror is located in a photographing light path and an upper position in which the mirror is retracted from the photographing light path;

a diaphragm drive mechanism which opens or closes the diaphragm of a lens;

a shutter;

a single-revolution cam gear which is driven by a motor in forward and rearward directions;

said single-revolution cam gear executing sequentially, by the forward one rotation thereof from its initial position, the stop-down operation to vary the diaphragm from the full-open position to the set diaphragm position and the upward movement of the mirror, the actuation of the shutter, the downward movement of the mirror, and the reset operation of the diaphragm to move from the stop-down position to the full-open position;

said single-revolution cam gear executing, by the rotation thereof in the rearward direction from its initial position, the stop-down operation to move the diaphragm from the full-open position to the set diaphragm position; and a preview switch which can be actuated from outside, said preview switch being provided in addition to a release switch so that when the release switch is turned ON, the single-revolution cam gear is rotated by a single revolution in the forward direction from the initial position, and when the preview switch is turned ON, the preview operation is carried out by the reverse rotation of the single-revolution cam gear within a predetermined angle range in which the stop-down operation takes place without causing an upward movement of the mirror;

said method comprising steps of:

returning the diaphragm to the full-open aperture position from the stop-down position when the release switch is turned ON during the preview operation by rotating the motor in the forward direction until the single-revolution cam gear is returned to the initial position; and photometering at the full-open aperture position.

2. A control method according to claim 1, wherein the single-revolution cam gear is rotated in the forward direction by a single revolution by the forward rotation of the motor after the photometering operation is carried out at the full-open aperture position.

3. A method for controlling a single lens reflex camera having a preview function, said camera comprising:

a mirror drive mechanism which moves a mirror between a lower position in which the mirror is located in a photographing light path and an upper position in which the mirror is retracted from the photographing light path;

a diaphragm drive mechanism which opens or closes the diaphragm of a lens;

a shutter;

a single-revolution cam gear which is driven by a motor in forward and rearward directions;

said single-revolution cam gear executing sequentially, by the forward one rotation thereof from its initial position, the stop-down operation to vary the diaphragm from the full-open position to the set diaphragm position and the upward movement of the mirror, the actuation of the shutter, the downward movement of the mirror, and the reset operation of the diaphragm to move from the stop-down position to the full-open position;

said single-revolution cam gear executing, by the rotation thereof in the rearward direction from its initial position, the stop-down operation to move the diaphragm from the full-open position to the set diaphragm position; and a preview switch which can be actuated from outside, said preview switch being provided in addition to a release switch so that when the release switch is turned ON, the single-revolution cam gear is rotated by a single revolution in the forward direction from the initial position, and when the preview switch is turned ON, the preview operation is carried out by the reverse rotation of the single-revolution cam gear within a predetermined angle range in which the stop-down operation takes place without causing an upward movement of the mirror;

said method comprising steps of:

returning the diaphragm to the full-open aperture position from the stop-down position when the release switch is turned ON during the preview operation by rotating the motor in the forward direction until the single-revolution cam gear is returned to the initial position; and further rotating of the single-revolution cam gear in the forward direction without being stopped at the initial position.

4. A control method according to claim 3, wherein if the release switch is turned ON while the preview switch is ON, the photometering operation is carried out when the single-revolution cam gear is returned to the initial position.

5. A single lens reflex camera having a preview function, comprising:

a mirror drive mechanism which moves a mirror between a lower position in which the mirror is located in a photographing light path and an upper position in which the mirror is retracted from the photographing light path;

a diaphragm drive mechanism which opens or closes the diaphragm of a lens;

a shutter;

a single-revolution cam gear which is driven by a motor in forward and rearward directions;

said single-revolution cam gear executing sequentially, by the a single forward rotation thereof from its initial position, the stop-down operation to vary the diaphragm from the full-open position to the set diaphragm position and the upward movement of the mirror, the actuation of the shutter, the downward movement of the mirror, and the reset operation of the diaphragm to move from the stop-down position to the full-open position;

said single-revolution cam gear executing, by the rotation thereof in the rearward direction from its initial position, the stop-down operation to move the diaphragm from the full-open position to the set diaphragm position;

a preview switch which can be actuated from outside, said preview switch being provided in addition to a release switch so that when the release switch is turned ON, the single-revolution cam gear is rotated by a single revolution in the forward direction from the initial position, and when the preview switch is turned ON, the preview operation is carried out by the reverse rotation of the single-revolution cam gear within a predetermined angle range in which the stop-down operation takes place without causing an upward movement of the mirror; and a controller which returns the diaphragm to the full-open aperture position from the stop-down position when the release switch is turned ON during the preview operation by rotating the motor in the forward direction until the single-revolution cam gear is returned to the initial position and photometering at the full-open aperture position.

\* \* \* \* \*

UNITED STATES PATENT AND TRADEMARK OFFICE
CERTIFICATE OF CORRECTION

| | | |
|---|---|---|
| PATENT NO. | : | 5,864,725 |
| DATED | : | January 26, 1999 |
| INVENTOR(S) | : | M.OGI |

It is certified that error appears in the above-identified patent and that said Letters Patent is hereby corrected as shown below:

At column 17, line 17 (claim 5, line 14) of the printed patent, delete "the".

Signed and Sealed this

Thirtieth Day of November, 1999

Attest:

Q. TODD DICKINSON

Attesting Officer

Acting Commissioner of Patents and Trademarks